Nov. 18, 1958 W. J. KROEGER ET AL 2,860,663
STRUCTURE FOR DIVERTING GASES OF HIGH VELOCITY
Filed Aug. 7, 1953
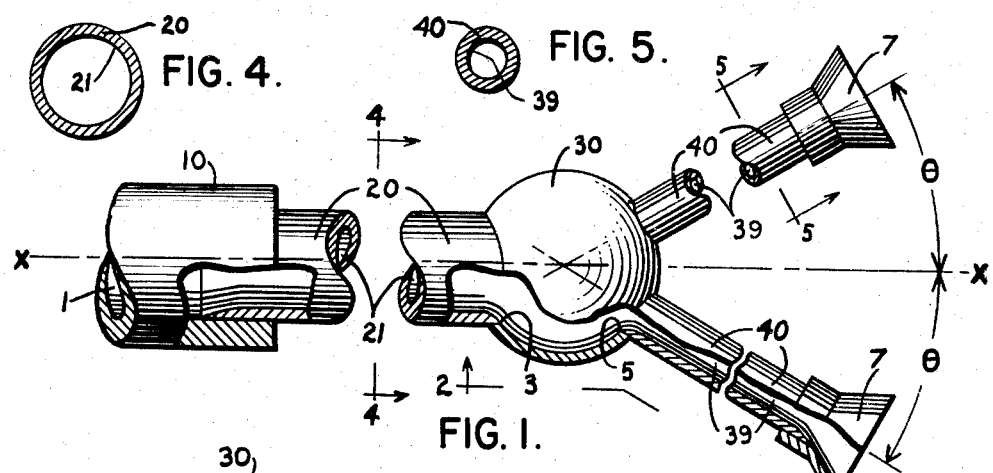
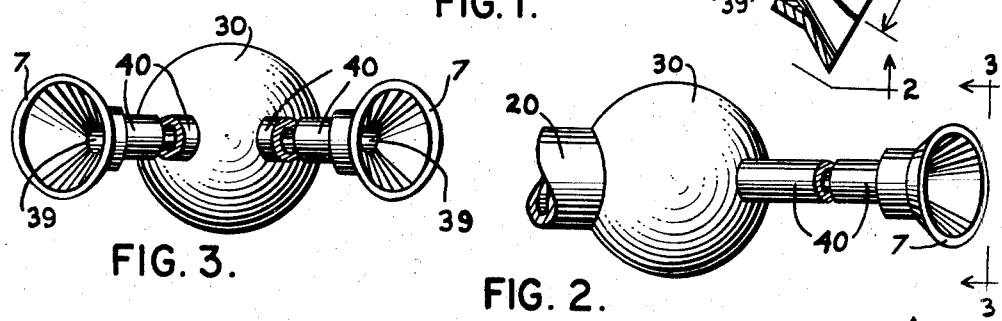
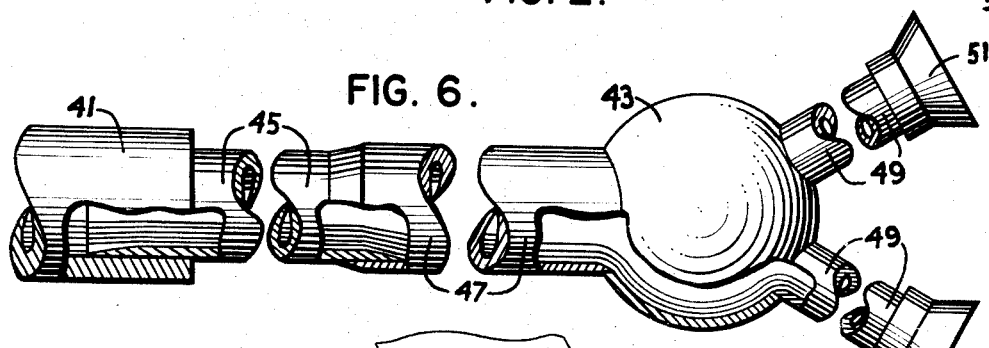
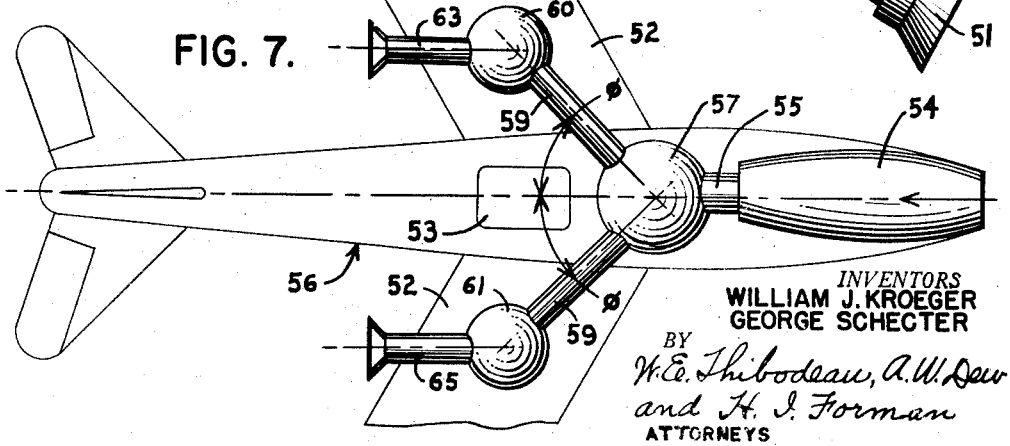
INVENTORS
WILLIAM J. KROEGER
GEORGE SCHECTER
BY
W. E. Thibodeau, A. W. Dow
and H. J. Forman
ATTORNEYS ര
United States Patent Office 2,860,663
Patented Nov. 18, 1958

2,860,663

STRUCTURE FOR DIVERTING GASES OF HIGH VELOCITY

William J. Kroeger, Philadelphia, and George Schecter, Somerton, Pa.

Application August 7, 1953, Serial No. 373,073

2 Claims. (Cl. 137—561)

(Granted under Title 35, U. S. Code (1952), sec. 266)

The invention described herein may be manufactured and used by or for the Government for governmental purposes without the payment of any royalty thereon.

The present invention relates to lightweight apparatus primarily intended for use in efficiently diverting the flow of compressible fluids traveling at high velocity.

The primary object of this invention, therefore, is to provide a structure whereby a stream of compressible fluid may be satisfactorily diverted from its path of flow.

It will be readily understood by those skilled in the art that whenever a stream of gas traveling at or near, and above, the speed of sound is diverted from its path of flow, the diverting means is subjected to severe stresses due to transmission of the momentum of the flowing stream to the diverting structure. Ordinarily, therefore, the diverting structure is of relatively heavy construction to withstand those severe stresses, thus resulting in a structure of objectionably large and heavy characteristics. It is, therefore, a more specific object of this invention to provide apparatus for diverting the flow of high velocity, compressible fluids which will substantially reduce resultant stresses, thereby permitting substantial savings in size and weight of the diverting structure.

It is a still further object of this invention to provide apparatus of novel construction whereby high velocity exhaust gases from jet engines, recoilless rifles, and the like, may be diverted and thus discharged at a point spaced from their associated mountings.

In furtherance of the objects of this invention, a hollow chamber having a plurality of orifices communicating therewith is used as the diverting structure for a high velocity fluid stream. The fluid stream enters the chamber through at least one duct and exits by means of at least one other duct which is angularly disposed relative to the original path of the stream. By virtue of the novel relationships between the relative areas of the inlet and outlet orifices hereinafter described, the diversion of the high velocity stream is efficiently effected with little loss of stream energy.

Other objects and advantages of this invention will become apparent during the course of the following detailed description taken in connection with the accompanying drawings forming a part of this specification and in which drawings:

Fig. 1 is a top plan view, partly broken away, of one arrangement of the invention;

Fig. 2 is a front elevational view, taken along line 2—2 of Fig. 1;

Fig. 3 is an end elevational view of the apparatus, taken along line 3—3 of Fig. 2;

Fig. 4 is a sectional view of the inlet orifice, taken along line 4—4 of Fig. 1, with all other parts removed;

Fig. 5 is a sectional view of an outlet orifice, taken along line 5—5 of Fig. 1, with all other parts removed;

Fig. 6 is a front elevational view, similar to Figure 1, showing a modified form of the invention, and Fig. 7 is a diagrammatic plan view of a gas diverting system embodying the principles of this invention and showing its application to an airplane fuselage (in phantom lines) and jet engine therefor.

In the drawings similar reference characters designate corresponding parts throughout the several views.

In general, the invention comprises, as shown in Figures 1 to 7, the following combined elements arranged in sequence along the path of the fluid stream; namely, a vessel or an incoming delivery conduit, an inlet duct, a compression chamber and a plurality of outlet ducts.

*Diversion of fluids flowing at less than supersonic velocities*

Referring particularly to Figures 1 to 5, the fluid to be diverted enters the diverting structure from its source or delivery conduit 10, through an opening 1 provided therein. Passing through this opening 1, and into an inlet duct 20 having an orifice of predetermined cross sectional area, as defined by the inner wall 21 thereof, the fluid enters the compression chamber 30 by means of an inlet opening 3.

Outlet openings 5 are provided in the compression chamber 30 to permit the gas to pass therethrough into the outlet orifices, as defined by the inner walls 39 of the outlet ducts 40, and thence directly to the atmosphere or, if it is desired to accelerate the flow, through expansion nozzles 7 provided at the outermost extremity of the outlet ducts 40, and then to the atmosphere. The compression chamber 30 may be constructed of any suitable high strength material such as steel, aluminum, an alloy, etc., depending upon heat and strength requirements. It has been found desirable to construct the chamber 30 in hollow spherical form to obtain the advantages of the well known stress distribution characteristics of a sphere. Such characteristics result in a structure of optimum over-all size and weight for any desired volume and strength. The size of the chamber 30 is dictated primarily by the cross sectional areas of the respective ducts and the relative angular disposition of those ducts with respect to each other. For reasons hereinafter discussed, it is important to this form of the invention that the sum total of the cross sectional areas of all the outlet orifices within the outlet ducts 40 be, within practical limits, equal to the cross sectional area of the inlet orifice within the inlet duct 20.

Well known principles relating to the expansion and compression of gases are employed to advantageously apportion the respective outlet and inlet orifice areas. In accordance therewith, it will be recognized that a large part of the energy of the fluid stream in the inlet duct 20 is in the form of kinetic energy, the velocity being comparatively high and the pressure comparatively low. Upon entry into the chamber 30, the fluid is decelerated and compressed; the kinetic energy is thus converted into the form of potential energy of compression. It will be readily appreciated that, if no outlet was provided in the chamber 30, continued flow would result in a substantial total reduction in velocity and a substantial increase in pressure of the stream. This characteristic change would represent a substantially complete conversion of the energy contained therein from kinetic to potential form with the chamber 30 thus simulating a storage tank. If, however, a total outlet orifice area was provided which was substantially less than the inlet orifice area, there would be a partial conversion of energy whereby a greater part of the energy entering the inlet would be preserved at potential energy (high pressure in the chamber 30) and a lesser part would be retained as kinetic energy (velocity in the outlet orifices). The undesirable result of this arrangement would be a back-pressure in the line, due to the pressure build-up in the chamber, thereby retarding flow of the incoming stream and reducing the effective outlet flow.

If on the other hand, a total outlet area was provided which was substantially greater than the inlet area, there would also be a partial conversion of the energy of the flowing stream. However, in this arrangement, due to the larger exit area, a greater part of the energy entering the inlet would be retained as kinetic energy and a lesser part preserved as potential energy. The undesirable result of this particular distribution of orifice areas would be severe impact of the stream on localized areas of the chamber due to the high velocity of the stream, thereby requiring the use of larger and heavier stream diverting means.

Therefore, in accordance with the principles of this invention, the orifices are so dimensioned that the total cross sectional area of the outlet orifices within the outlet ducts 40 is made substantially equal to the cross sectional area of the inlet orifice within the inlet duct 20, whereby the total kinetic energy of discharge through the outlet orifices will equal that of the inlet orifice (with the exception of heat losses). Dynamic loadings on the diverting structure due to gas motion are thus minimized by the deceleration occurring in the compression chamber 30. The practical result of this favorable distribution of orifice areas is the substantial elimination of back-pressure within the inlet duct due to sufficient outlet area, the prevention of localized impact of the high velocity fluids on the chamber walls due to the reduction in the stream velocity within the chamber and the assurance of maximum usefulness of the discharge stream velocity.

The angle $\theta$ between the outlet ducts 40 may be varied according to need, depending upon the size and shape of the object about which the stream is being diverted, or to the extent that it is desired to divert the stream for any purpose. It will be realized that, if it is desired to obtain balance along the axis X of the fluid conducting structure, the resultant of the reactive forces caused by the stream exiting the chamber 30 through the outlet ducts 40 must be in a direction directly opposite to and of equal magnitude to the force exerted by the inlet fluid flow through the inlet duct 20. However, whenever a fluid stream is diverted the components of forces reacting to and in a direction opposite to the force exerted by the fluid inlet stream will be of lesser magnitude, thereby precluding the state of complete equilibrium. Relative balance may be obtained, however, by disposing the axes of the outlet ducts 40 at an equal angle $\theta$ to the longitudinal axis X of the inlet duct 20 and in the same plane therewith as shown in Figure 1, where, in accordance with the requirements set forth by the present invention, the cross sectional area of each outlet orifice is made equal to one half the cross sectional area of the inlet orifice. Such an arrangement produces stability in all directions except in the direction of the longitudinal axis of the inlet orifice 20.

Similar stability might also be achieved by varying the cross sectional area of one outlet orifice with respect to the other outlet orifice and also varying the discharge angle of each such orifice to compensate therefor, such that the components of force normal to the X axis produced by the exiting flow through the outlet ducts 40 will be balanced. In the same respect, it will be apparent that each orifice may be varied in cross sectional area and angular disposition to obtain any particular predetermined degree of force unbalance, if such is desired.

*Diversion of fluids flowing at supersonic velocities*

It is sometimes found desirable to have the compression chamber receive the fluid stream at supersonic velocities. In such event, the fluid stream traveling within the delivery duct at less than supersonic speeds may be accelerated to supersonic velocity prior to its entry into the compression chamber. If, as shown in Fig. 6, a gas flowing at sonic velocity in the inlet duct 45 is allowed to expand into a nozzle 47 having a larger cross-sectional orifice area, the gas velocity in the nozzle 47 will exceed the speed of sound. As a result of expanding the gas in the nozzle 47 a pressure shock will be formed in the fluid stream and the ultimate recompression pressure in the chamber 43 will be substantially less than in the case of sonic or sub-sonic flow. In order to maintain the mass flow out of the chamber at the substantially reduced pressure, the total outlet orifice area must, therefore, be increased. The expansion in the nozzle 47 will thus determine the excess of the total cross sectional area of the outlet orifices in the outlet ducts 49 to that of the inlet orifice in the inlet duct 45 which will permit the mass flow out of the chamber to be maintained.

The basic chamber characteristics and angle of flow diversion may be determined as hereinbefore explained; the cross sectional areas of the respective orifices may be similarly ascertained. However, it is to be emphasized that the sum total of the cross sectional areas of the outlet orifices must now be greater than the cross sectional area of the inlet orifice to offset the effects of the lowered recompression pressure in the chamber 43.

It will be noted that although the fluid entering the chamber 43 is traveling at supersonic velocity, the fluid exiting the chamber by means of the outlet ducts 49, will be at sonic velocity. Nevertheless, the kinetic energy represented by the velocity in excess of the speed of sound is preserved by the conversion of that energy into potential form; i. e., pressure. Thus, there is, as a result of the reduction in velocity, an increase in pressure of the fluid exiting through the outlet duct 49. If, however, it is desired to accelerate the fluid flow exiting the outlet ducts 49, expansion nozzles 51 may be attached thereto, as shown in the drawings.

Having selected the proper orifice areas in accordance with the aforementioned principles, it thus follows that, in all embodiments of this invention, the mass rate of fluid flow leaving the compression chamber will equal the mass rate entering the chamber, once equilibrium pressure within the chamber is established by uniform flow.

*Utilization of fluid diverting structure*

Although the use of only one inlet and two outlet ducts has been specifically illustrated, it should be understood that any number of such ducts may be utilized within the scope of this invention provided the sum total of the cross sectional areas of the outlet orifices is substantially equal to or slightly greater than the sum total of the cross sectional areas of the inlet orifices depending upon the stream velocity as heretofore distinguished. By maintaining this relationship each single orifice may be of any desired cross sectional area. In this same respect each orifice may have its axis disposed at any angle relative to the others. Since a sphere offers the most design advantages for the chamber, the axis of each orifice should preferably be along a radius of the spherical chamber. These variations of individual orifice area and relative angular disposition thus permit a wide field of application according to desired results of balance and efficiency.

It will also be readily understood that in aircraft employing jet propulsion, the gases from the engine may, by this means, be diverted before discharge to the atmosphere. This may offer advantages with respect to the disposition of the major elements of the aircraft structure and associated equipment. Also by means of this invention, the recoil balancing gases of recoilless rifles may be diverted and discharged to the atmosphere at a location remote from the rifle chamber. This may offer advantages with respect to the installation of recoilless rifles in (or on) vehicles such as aircraft, tanks, etc.; the principal advantage being displacement of the discharge blast to locations where its damaging effects on surrounding structures and personnel may be reduced.

Fig. 7, for example, represents a system embodying the principles of this invention whereby a series of flow diverters may be utilized to divert a fluid stream, such as the exhaust of a jet aircraft engine 54, around the cockpit 53, and outwardly through the wings 52, of an airplane 56. The fluid flowing from its source 54 at less than supersonic velocities, for example, is received by an inlet duct 55 having an orifice of a given cross sectional area A and thence into an associated compression chamber 57 embodying the principles of the instant invention. A pair of outlet ducts 59, each having a cross sectional orifice area A/2, are provided with their respective axes disposed at an angle $\theta$ with respect to the axis of the inlet duct 55. Associated with both of the outlet ducts 59 are secondary compression chambers 60 and 61 for receiving the fluid from the primary compression chamber 57. Each secondary compression chamber 60, 61 has associated with it a single outlet duct 63, 65, respectively, having a cross sectional orifice area A/2 and disposed parallel to the flow of the fluid at its source 54 whereby substantially the full thrust of the jet engine is retained. It should be noted that any number of ducts can be associated with the secondary compression chambers 60, 61 provided the total cross sectional area of the outlet orifices associated with each chamber 60, 61 is equal to the respective inlet orifice area A/2.

It will become obvious to those persons skilled in the art that many other and different arrangements may be used within the purview of this invention. It is to be understood that the forms of the inventions herewith shown and described are to be taken as the preferred examples of the same and that changes in the shape, size and arrangement of the parts may be resorted to without departing from the spirit of the invention. It is, therefore, desired that the particular forms disclosed be taken as illustrative and not as limiting. We, furthermore, do not wish to be limited beyond the limitations which may be imposed by the following claims.

We claim:

1. A system for displacing the flow of a fluid stream laterally comprising: a first receiver associated with a fluid source for receiving the fluid in a stream, comprising at least one hollow spherical chamber, additional receivers for receiving said fluid stream from said first receiver comprising at least two hollow spherical chambers; at least one inlet portion associated with each of said chambers, at least one outlet portion associated with each of said chambers to exit fluid from respective ones of said chambers, conduit connecting each inlet portion of each of said additional receivers to an outlet portion of said first receiver; all of said receivers together with their outlet and inlets being disposed with their respective central axes in a common plane; said additional receivers together with their respective outlets and inlets being symmetrically disposed on opposite sides of the central axis of the inlet to said first receiver; the sum total outlet area for each said chamber being at least as great as the sum total inlet area of said chamber.

2. Apparatus for altering the flow of fluid streams of at least sonic velocity comprising a substantially hollow-spherical chamber, a plurality of orifices communicating with the interior of said chamber, at least one of said orifices comprising an inlet, at least two others of said orifices being angularly related to said inlet orifice and comprising outlets, the angular displacement thereof being such as to divert the fluid stream from said inlet orifice with substantially no resulting torque, the cross sectional area of said outlet orifices being substantially equal to the cross sectional area of said inlet orifice, and a conduit associated with said inlet orifice including expansion nozzle means disposed to deliver the fluid flow directly into said chamber through said inlet orifice, said nozzle means being so constructed and arranged as to decrease the pressure and simultaneously proportionately increase the velocity of the flow of fluid prior to the entry thereof into said chamber.

References Cited in the file of this patent

UNITED STATES PATENTS

| | | |
|---|---|---|
| 1,611,475 | Maxim | Dec. 21, 1926 |
| 1,844,855 | Hoyt | Feb. 9, 1932 |
| 2,512,823 | Blundell | June 27, 1950 |
| 2,644,542 | Bourne | July 7, 1953 |
| 2,654,437 | Woods | Oct. 6, 1953 |

FOREIGN PATENTS

| | | |
|---|---|---|
| 20,639 | Denmark | Oct. 1, 1915 |
| 151,132 | Great Britain | Sept. 23, 1920 |
| 227,533 | Great Britain | Jan. 19, 1925 |